Dec. 24, 1968     H. L. PAUL, JR     3,417,628
MOTION CONVERTING MECHANISM
Filed Oct. 21, 1966                 2 Sheets-Sheet 1
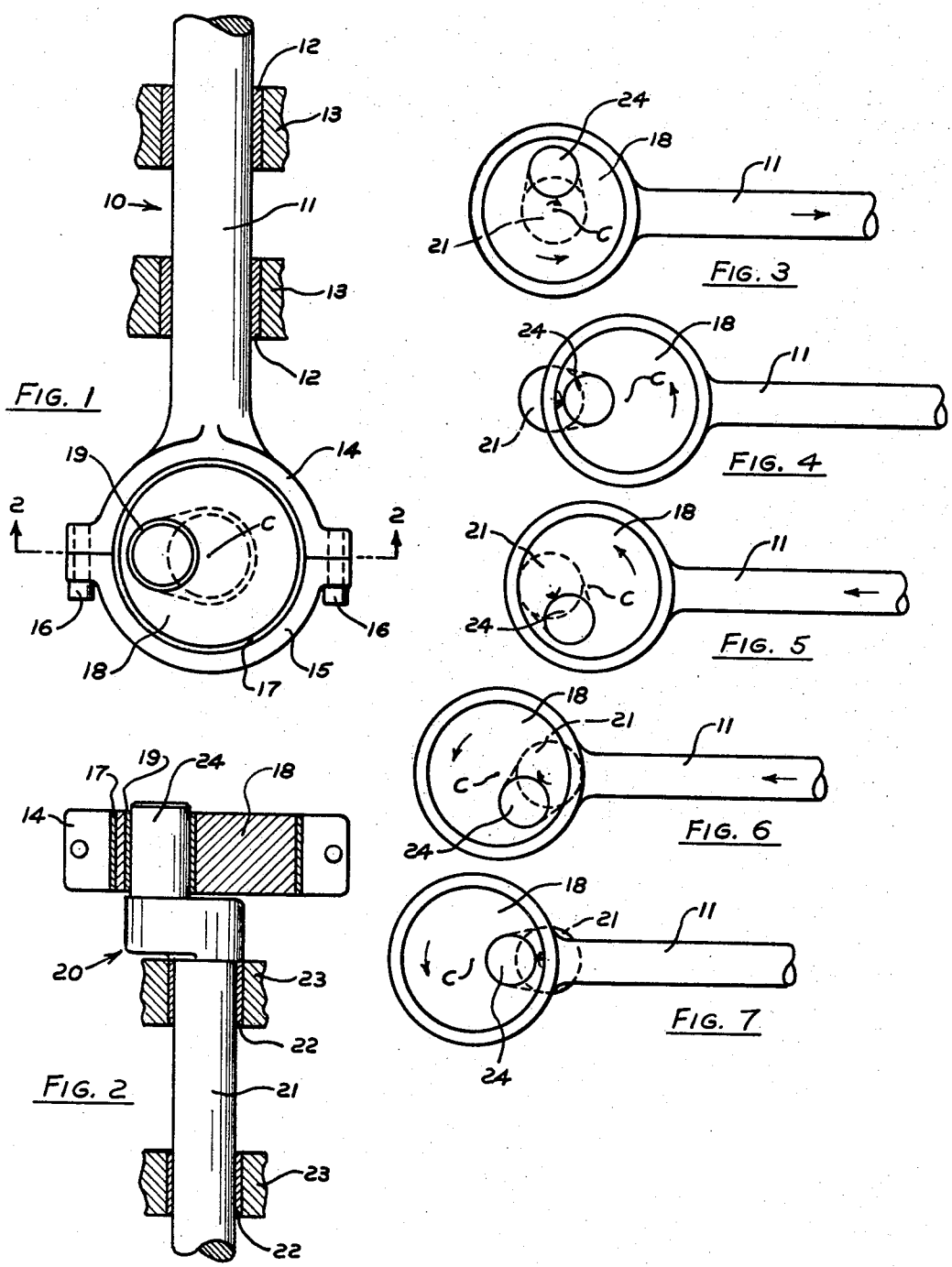
INVENTOR.
HERMAN L. PAUL, JR.
BY
*F. J. Pisarra*
ATTORNEY

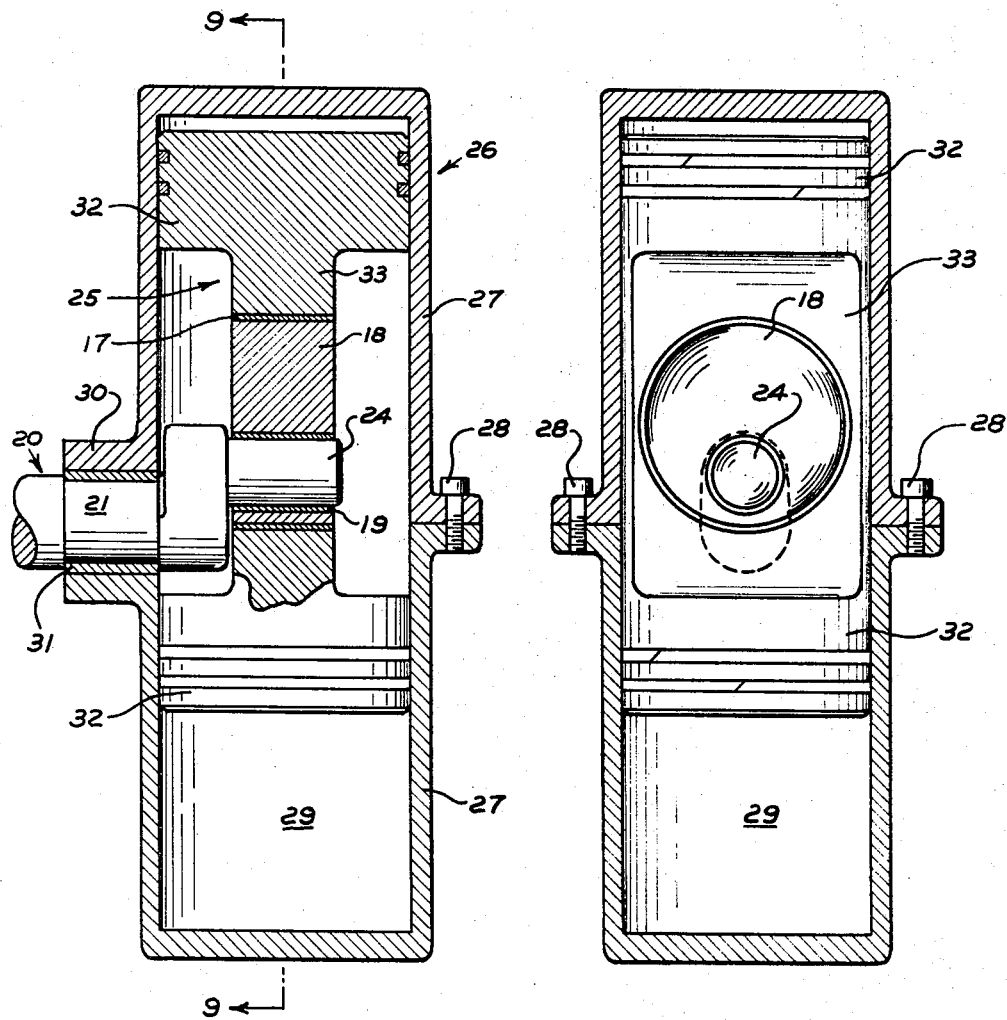

United States Patent Office 3,417,628
Patented Dec. 24, 1968

3,417,628
MOTION CONVERTING MECHANISM
Herman L. Paul, Jr., 450 Westover Road,
Stamford, Conn. 06902
Filed Oct. 21, 1966, Ser. No. 588,509
3 Claims. (Cl. 74—48)

ABSTRACT OF THE DISCLOSURE

A compact, relatively lightweight mechanism for converting reciprocating motion to rotary motion and vice versa in which a reciprocable unit is slidable in a support and a rotatable unit is mounted for rotation relative to the support. The reciprocable unit carries a disc which is rotatable about a first axis. The rotatable unit includes a shaft which is rotatable about a second axis that is parallel to the first axis. Integral with the shaft is a pin which registers with an opening in the disc and is rotatable relative to the disc about a third axis which is parallel to the first and second axes. The third axis is offset at all times from the first and second axes.

---

This invention relates to the art of motion conversion and, more particularly, to an improved and simplified mechanism for converting reciprocating motion to rotary or oscillatory motion and vice versa.

The primary object of this invention is to provide a novel, simplified and improved mechanism for converting reciprocating motion to rotary motion and vice versa.

Another object of this invention is to provide a mechanism of the character indicated that eliminates the need for conventional connecting means, such as the usual connecting rod.

A further object of this invention is to provide a mechanism for converting reciprocating motion to rotary motion and vice versa, the mechanism being especially useful in opposed piston designs of internal combustion engines, pumps and the like, wherein the mechanism permits employment of a one-piece construction incorporating both pistons.

This invention has for a still further object the provision of a mechanism of the character indicated that is simple, compact and lightweight in design; that is sturdy and durable in construction; that is reasonable in manufacturing and maintenance costs; and that is capable of performing its intended functions in a dependable and efficient manner.

The mechanism of this invention affords a number of worthwhile advantages. For one thing, its compact and relatively lightweight design effects substantial reductions in weight to horsepower ratio in various types of apparatus, thereby resulting in lighter weight power units. Another advantage resides in desirable mechanical advantage due to the novel arrangement of an idler disc and associated elements. Also, the mechanism permits longer strokes and the use of smaller pistons enabling more complete combustion to occur in internal combustion engine apparatus. This, in turn, results in increased engine efficiency and decreased amounts of pollutants exhausting to the atmosphere. These and other advantages will be evident to persons trained in the art from the ensuing detailed description and the annexed drawings.

The mechanism of this invention has wide application. Due to its unique, compact and lightweight design and its several advantages, as compared to conventional motion converting mechanisms, the present mechanism may be readily and advantageously employed to convert motion in various power unit constructions including automobiles, air planes, outboard motors, power lawn mowers, power snow removers, power tools, small motor-generator sets, and portable units for pumps, compressors and the like.

The enumerated objects and advantages and additional objects and advantages, will be readily understood by persons skilled in the art from the following detailed description taken in conjunction with the accompanying drawings which respectively describe and illustrate two forms of construction embodying this invention.

In the drawings, wherein like reference numerals denote corresponding parts throughout the several views:

FIG. 1 is a front elevation view of one form of mechanism according to this invention, partly in central vertical cross section;

FIG. 2 is a view taken along line 2—2 of FIG. 1;

FIGS. 3 through 7 are schematic views showing the relative positions of various parts of the mechanism of FIGS. 1 and 2 during successive portions of a complete operating cycle of the mechanism;

FIG. 8 is a view in central vertical cross section of another form of mechanism according to this invention; and FIG. 9 is a view taken along line 9—9 of FIG. 8.

Referring initially to FIGS. 1 and 2, the form of the invention illustrated therein includes a reciprocable unit 10 which comprises a rod 11 that is vertically slidable (FIG. 1) in a pair of spaced coaxial bushings 12 which are mounted in corresponding stationary supports 13. Unit 10 also comprises a clamp consisting of an arcuate first part 14, which is integral with rod 11, and an arcuate second part 15, which is detachably secured to part 14 by bolts 16. Each part 14 and 15 defines a semicircular opening. These parts, as shown in FIG. 1, cooperate to define a circular opening for reception and retention of a sleeve bearing 17. The longitudinal axis of bearing 17 is preferably normal to the axis of rod 11.

A member 18, preferably in the form of a disc, is mounted for rotation in bearing 17. A sleeve bearing 19 is provided in an opening in the disc. It will be observed that the longitudinal axis of bearing 19 is eccentric to that of bearing 17 and is, therefore, eccentric to the axis of rotation of disc 18.

The mechanism also includes a rotatable unit 20 which, as best shown in FIG. 2, comprises a shaft 21 that is mounted for rotation in a pair of spaced coaxial bushings 22 that are carried by corresponding supports 23. A crank pin 24 is integral with shaft 21 and registers with and is freely rotatable in bearing 19. The longitudinal axes of shaft 21 and pin 24 are parallel to each other and to the rotary axis of disc 18. These axes are all normal to the path of reciprocation of rod 11. Also, the longitudinal axis of rod 11 and the rotary axis of disc 18 intersect, the axis or center of the disc being denoted by the letter C.

If desired, anti-friction bearings, such as ball, roller or needle type bearings, may be used in place of the illustrated sleeve type bushings 12 and 22 and bearings 17 and 19.

Reference is now had to FIGS. 3 through 7 for an understanding of the mode of operation of the mechanism which is shown in detail in FIGS. 1 and 2. It is assumed, for purposes of illustration, that the mechanism is being utilized to convert applied reciprocatory motion of rod 11 to rotary motion of shaft 21. It is also assumed that the parts are in the relative position shown in FIG. 3 and that rod 11 is at the midpoint of its motion or stroke toward the right, as indicated by the arrow in this view. Since pin 24 is constrained to move in a circular path about the axis of shaft 21, continued movement of rod 11 toward the right effects corresponding increments of counter-clockwise rotation of disc 18 about its center C, counter-clockwise movement of pin 24 and clockwise rotation of shaft 21. FIG. 4 shows the relative position of the parts when rod 11 has reached the end of its stroke to the right, whereupon the rod reverses direction and moves toward the left. The parts are successively actuated to the relative positions shown in FIGS. 5, 6 and 7 during such movement of the rod to the left. FIG. 7 illustrates the relative position of the parts when the rod is at the end of its motion to the left, at which time it again reverses direction and returns the parts to the position shown in FIG. 3, thereby completing one cycle.

During each cycle, disc 18 rotates 360° and pin 24 moves bodily through 360° about disc center C in a counter-clockwise direction and shaft 21 rotates through 360° in a clockwise direction about its axis. As will be evident from an examination of FIGS. 1 and 3 through 7, the length of stroke of reciprocable unit 10 is equal to twice the throw of pin 24, this throw being the diameter of a circle having a radius extending from disc center C to the longitudinal axis of the pin.

The mechanism shown in FIGS. 1 through 7 may also be employed advantageously to convert rotary motion to reciprocatory motion, if desired. To this end, rotation is imparted to shaft 21 by a suitable means (not shown). Such rotation of the shaft is translated into reciprocatory motion of rod 11 through the medium of pin 19 and disc 18, the several parts cooperating in a manner similar to that earlier described.

FIGS. 8 and 9 illustrate a modification of the present invention as applied to a one cylinder opposed piston engine or similar device. The motion converting mechanism of this form of the invention includes a reciprocable unit 25 that is encased and vertically slidable in a cylinder 26 comprising a pair of relatively inverted hollow sections 27 which are joined together by bolts 28 and which define a cylinder bore 29. The cylinder is provided at one side with a central, laterally projecting, tubular extension 30 which carries a sleeve bearing 31.

Unit 25 is preferably of one-piece construction and comprises a pair of spaced pistons 32 and a web 33 intermediate the pistons. This form of the invention also includes a sleeve bearing 17, a disc 18, a sleeve bearing 19, a rotatable unit 20, a rotary shaft 21 and a pin 24, all of which are identified above. In this instance, disc 18 is mounted for rotation in web 33 while shaft 21 is mounted for rotation in cylinder extension 30.

In operation, unit 25 is reciprocated in cylinder bore 29 by any suitable means known to the art. Reciprocating motion of unit 25 is converted into rotary motion of shaft 21 and vice versa in the manner described earlier herein.

It will be appreciated that incorporation of the present invention in an opposed piston engine or the like allows use of a one-piece construction for the opposed pistons, thereby affording several important benefits and advantages over conventional constructions. The overall height of the cylinder is reduced considerably by eliminating conventional connecting rods, with a consequent reduction in weight. By utilizing a single rigid piston unit in place of ordinary two piston units, side thrust forces on the cylinder walls are reduced substantially. This results in less wear of the cylinder walls. Additionally, the elimination of connecting rods reduces the reciprocating mass of the system, thereby further reducing wear and losses in the engine.

From the foregoing, it is believed that the objects, advantages, construction and operation of the present invention will be readily comprehended by persons skilled in the art, without further description. Although the invention has been herein shown and described in several practicable forms, it is recognized that certain parts or elements thereof are representative of other parts or elements which may be used in substantially the same manner to accomplish substantially the same results. Therefore, it is to be understood that this invention is not to be limited to the exact details described herein, but is to be accorded the full scope and protection of the following claims.

I claim:
1. In a motion converting mechanism, support means, a reciprocable unit slidable in the support means, a first member carried by and rotatable relative to the reciprocable unit about a first axis, and a rotatable unit comprising a shaft mounted for rotation in the support means about a second axis and a second member comprising a pin carried by and rotatable with the shaft, said pin being coupled to and rotatable relative to the first member about a third axis.

2. A mechanism according to claim 1 wherein the first member comprises a disc and wherein the pin registers with an opening in the disc.

3. A mechanism according to claim 2 wherein said axes are parallel, said third axis being offset at all times from said first and second axes.

References Cited

UNITED STATES PATENTS

| 1,979,987 | 11/1934 | Mullin | 74—595 |
| 2,287,673 | 6/1942 | Farrell | 74—44 |
| 2,287,472 | 6/1942 | Eby | 74—44 |
| 2,592,237 | 4/1952 | Bradley | 74—571 |

FRED C. MATTERN, Jr., *Primary Examiner.*

WESLEY S. RATLIFF, *Assistant Examiner.*

U.S. Cl. X.R.

74—571